(12) United States Patent
Soejima

(10) Patent No.: US 7,357,410 B2
(45) Date of Patent: Apr. 15, 2008

(54) AIRBAG COVER AND METHOD OF MANUFACTURING

(75) Inventor: Naoki Soejima, Higashioumi (JP)

(73) Assignee: Takata Corporation, Tokyo (JP)

( * ) Notice: Subject to any disclaimer, the term of this patent is extended or adjusted under 35 U.S.C. 154(b) by 230 days.

(21) Appl. No.: 11/193,471

(22) Filed: Aug. 1, 2005

(65) Prior Publication Data

US 2006/0028003 A1 Feb. 9, 2006

(30) Foreign Application Priority Data

Aug. 6, 2004 (JP) .............................. 2004-230705

(51) Int. Cl.
*B60R 21/20* (2006.01)
(52) U.S. Cl. ................................. 280/728.3
(58) Field of Classification Search ................ 280/732, 280/728.3; 83/875
See application file for complete search history.

(56) References Cited

U.S. PATENT DOCUMENTS

| | | | |
|---|---|---|---|
| 5,779,262 A | * | 7/1998 | Totani et al. ............ 280/728.3 |
| 5,803,489 A | | 9/1998 | Nusshor |
| 5,979,931 A | * | 11/1999 | Totani et al. ............ 280/728.3 |
| 6,384,137 B1 | * | 5/2002 | Mizutani et al. .............. 525/88 |
| 6,716,519 B2 | * | 4/2004 | Ueno et al. ............. 428/308.4 |
| 7,128,334 B2 | * | 10/2006 | Leland et al. ............ 280/728.3 |
| 2002/0042235 A1 | * | 4/2002 | Ueno et al. .................. 442/227 |
| 2002/0063417 A1 | | 5/2002 | Merrifield et al. |
| 2004/0140652 A1 | | 7/2004 | Takahashi |
| 2005/0052002 A1 | * | 3/2005 | Hayashi et al. .......... 280/728.3 |

FOREIGN PATENT DOCUMENTS

| | | |
|---|---|---|
| EP | 1209044 | 5/2002 |
| GB | 2276345 | 9/1994 |
| JP | 2002-12116 | 1/2002 |

\* cited by examiner

*Primary Examiner*—Faye M. Fleming
(74) *Attorney, Agent, or Firm*—Foley & Lardner LLP

(57) ABSTRACT

A method for manufacturing an airbag cover may include a molding step for forming a molded airbag-cover body that includes an integrated combination of a top panel and a container, and a tearing-line formation step for post-processing the molded airbag-cover body obtained in the molding step to form a tearing line having a depth less than a panel thickness of the top panel. An ultrasonic machining device may be used in the tearing-line formation step to form the tearing line.

10 Claims, 6 Drawing Sheets

AIRBAG COVER AND METHOD OF MANUFACTURING

BACKGROUND

The present invention relates to methods for manufacturing airbag covers used for covering vehicle airbags.

A typical airbag cover installed in a vehicle cabin, such as a cabin of an automobile, is provided with a box-shaped container portion disposed on a reverse face of a top-panel portion having a flat-plate-like structure. A preliminarily-folded vehicle airbag is housed in this container portion so that the airbag cover covers a side of the vehicle airbag proximate a vehicle occupant. Japanese Unexamined Patent Application Publication No. 2002-12116 (incorporated by reference herein), for example, discloses a method for manufacturing an airbag cover in which the top-panel portion and the box-shaped container portion are joined together by welding. However, with respect to an airbag cover of this type having the box-shaped container portion disposed on the reverse face of the flat-plate-like top-panel portion, it is in great demand that the airbag cover can be manufactured in a more reasonable manner.

SUMMARY OF THE INVENTION

An object of at least one embodiment of the present invention is to provide a method for efficiently manufacturing an airbag cover that is to be used for covering a vehicle airbag.

According to an embodiment of the present invention, a method for manufacturing an airbag cover includes forming an airbag cover that includes a plate-like top panel for covering a vehicle airbag from a vehicle-cabin side, a container that is disposed on a reverse face of the top panel and that houses a vehicle airbag, and a linear groove having a depth less than a panel thickness of the top panel, wherein forming includes a molding step for forming a molded airbag cover body, wherein the airbag cover body includes an integrated combination of the top panel and the container, and a groove-forming step for forming the linear groove.

According to an embodiment of the present invention, an airbag cover includes a plate-like top panel for covering a vehicle airbag from a vehicle-cabin side, a container that is disposed on a reverse face of the top panel and that houses a vehicle airbag, and a linear groove having a depth less than a panel thickness of the top panel, wherein the airbag cover is formed by a molding step for forming a molded airbag cover body, wherein the airbag cover body includes an integrated combination of the top panel and the container, and a groove-forming step for forming the linear groove.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
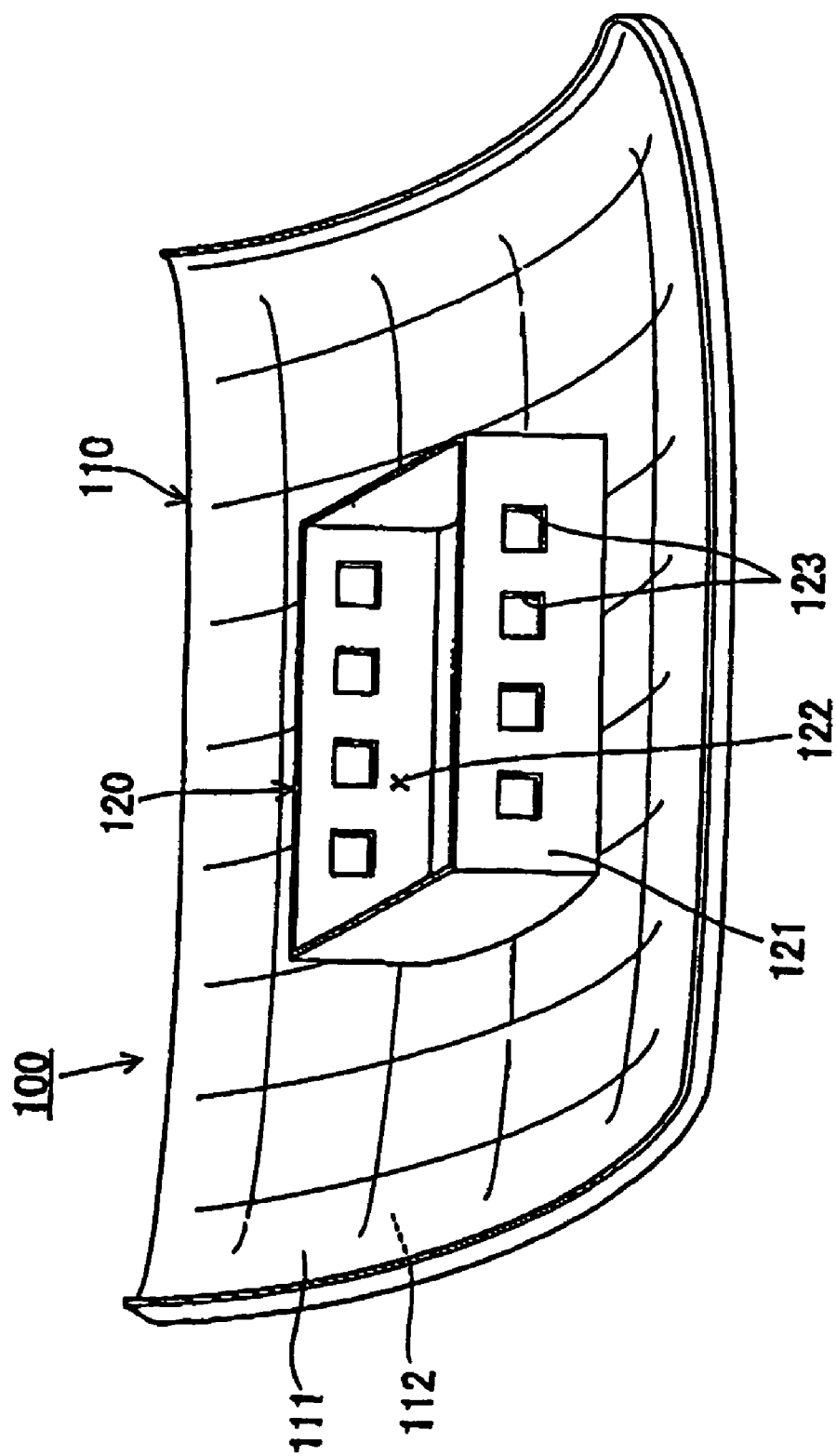
FIG. 1 is a perspective view illustrating a reverse face of an airbag cover according to an embodiment of the present invention.
Figure 2:
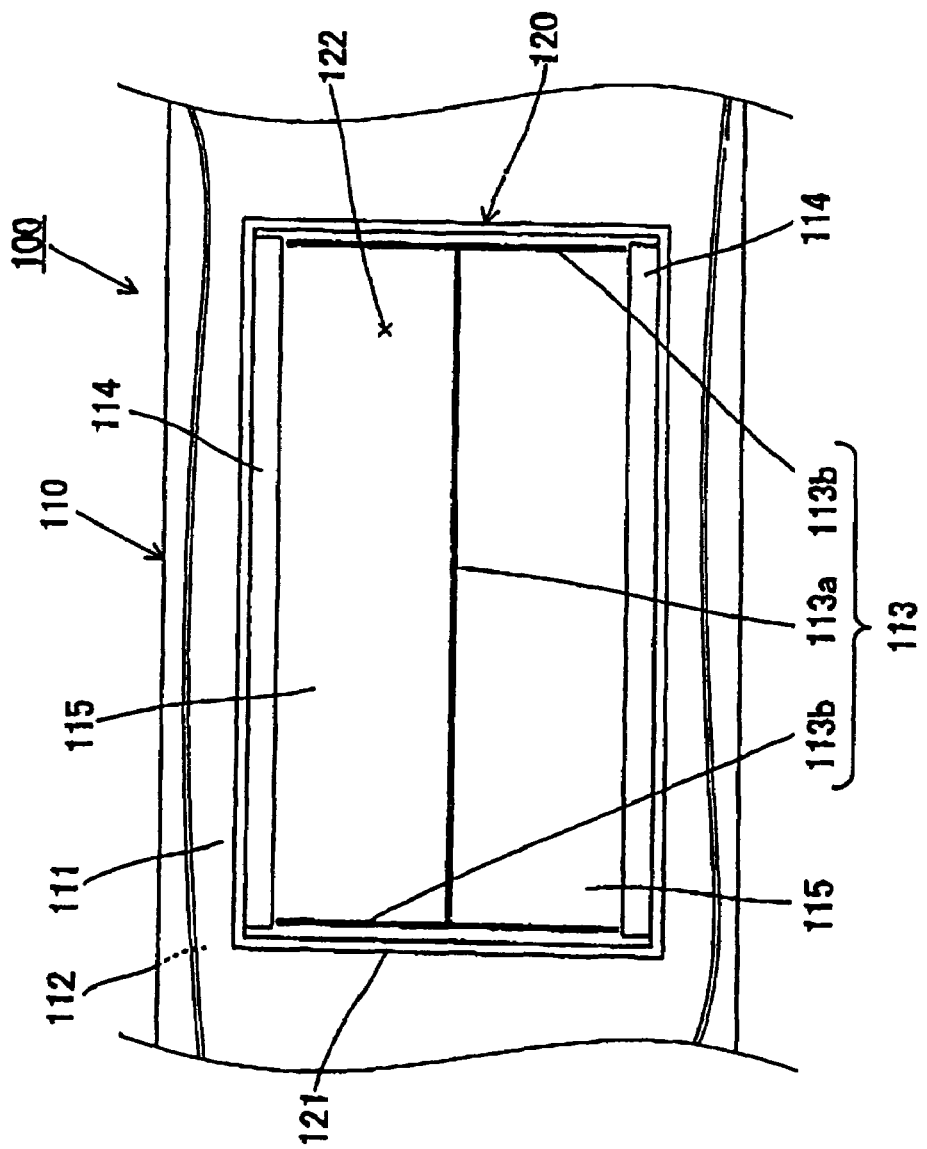
FIG. 2 is a plan view illustrating the reverse face of the airbag cover according to an embodiment of the present invention.

As shown in FIGS. 1 and 2, the airbag cover 100, according to an embodiment of the present invention, may be used for covering a vehicle airbag in a vehicle (i.e. a vehicle airbag 130 which will be described later) from a vehicle-cabin side. FIG. 1 is a perspective view illustrating a reverse face of the airbag cover 100 according to an embodiment of the present invention. FIG. 2 is a plan view illustrating the reverse face of the airbag cover 100. The airbag cover 100 may be installed in a vehicle cabin of an automobile at a position in front of a passenger seat that seats a vehicle occupant.

The airbag cover 100 may include a three-dimensional top panel 110 and a box-shaped container 120. The top panel 110 and the container 120 may be formed of a resin material, such as polypropylene (PP) and olefin elastomer (TPO).

The top panel 110 may have a reverse face 111 on which the container 120 is integrally provided. When the airbag cover 100 is installed in the vehicle, a front side of the top panel 110 (i.e. a front face 112 shown in FIG. 1) may face the vehicle-cabin side, namely, a side proximate a vehicle occupant subject to protection. In this situation, this means that the reverse face 111 defines a back side of the top panel 110. Consequently, the reverse face 111 of the top panel 110 may also act as the reverse face of the airbag cover 100. Moreover, the reverse face 111 of the top panel 110 may have a segmental region defined by the container 120, and in this segmental region, a tearing line (i.e. a tearing line 113 shown in FIG. 2) may be provided.

The tearing line 113 provided in the top panel 110 may have a thin profile for allowing the airbag cover 100 to deploy when the vehicle airbag is being inflated. In this embodiment, the tearing line 113 may be defined by a linear groove provided in the reverse face 111 of the top panel 110. In detail, the tearing line 113 may be defined by a linear thin-profile section whose panel thickness is relatively smaller than that of other sections of the top panel 110. In the example shown in FIG. 2, the tearing line 113 is a combination of one line of first linear-groove segment 113a and two lines of second linear-groove segments 113b, 113b in plan view, such that the combination forms a substantially H-shape in plan view. The first linear-groove segment 113a may extend linearly in the horizontal direction in FIG. 2, whereas the second linear-groove segments 113b may extend linearly in the vertical direction in FIG. 2 (that is, in a direction perpendicular to the extending direction of the first linear-groove segment 113a) at two respective opposite ends of the first linear-groove segment 113a.

Furthermore, the reverse face 111 of the top panel 110 may be provided with long hinges 114 respectively adjacent to opposite ends of the second linear-groove segments 113b, such that the hinges 114 extend parallel to each other along the first linear-groove segment 113a. The hinges 114 may be defined by thin-profile sections (i.e. depressed sections) with respect to the thickness direction of the top panel 110. The hinges 114 and the tearing line 113 may define a pair of deployment doors 115 in the top panel 110. The top panel 110 may be ripped open along the tearing line 113 when the vehicle airbag is being inflated, and thus forms the pair of deployment doors 115. The pair of deployment doors 115 may be deployable in a rotatable manner about the corresponding hinges 114.

The container 120 may be provided with a supporting portion 121 protruding outward from the reverse face 111 of the top panel 110. The supporting portion 121 may define a container space 122 which functions as a space for housing the vehicle airbag (i.e. the vehicle airbag 130 which will be described later). Moreover, the walls of the supporting portion 121 may be provided with a plurality of rectangular holes 123. When a retainer 140, which will be described later, is to be attached to the container 120, hook members 142 of the retainer 140 may be hooked the holes 123.

Figure 3:
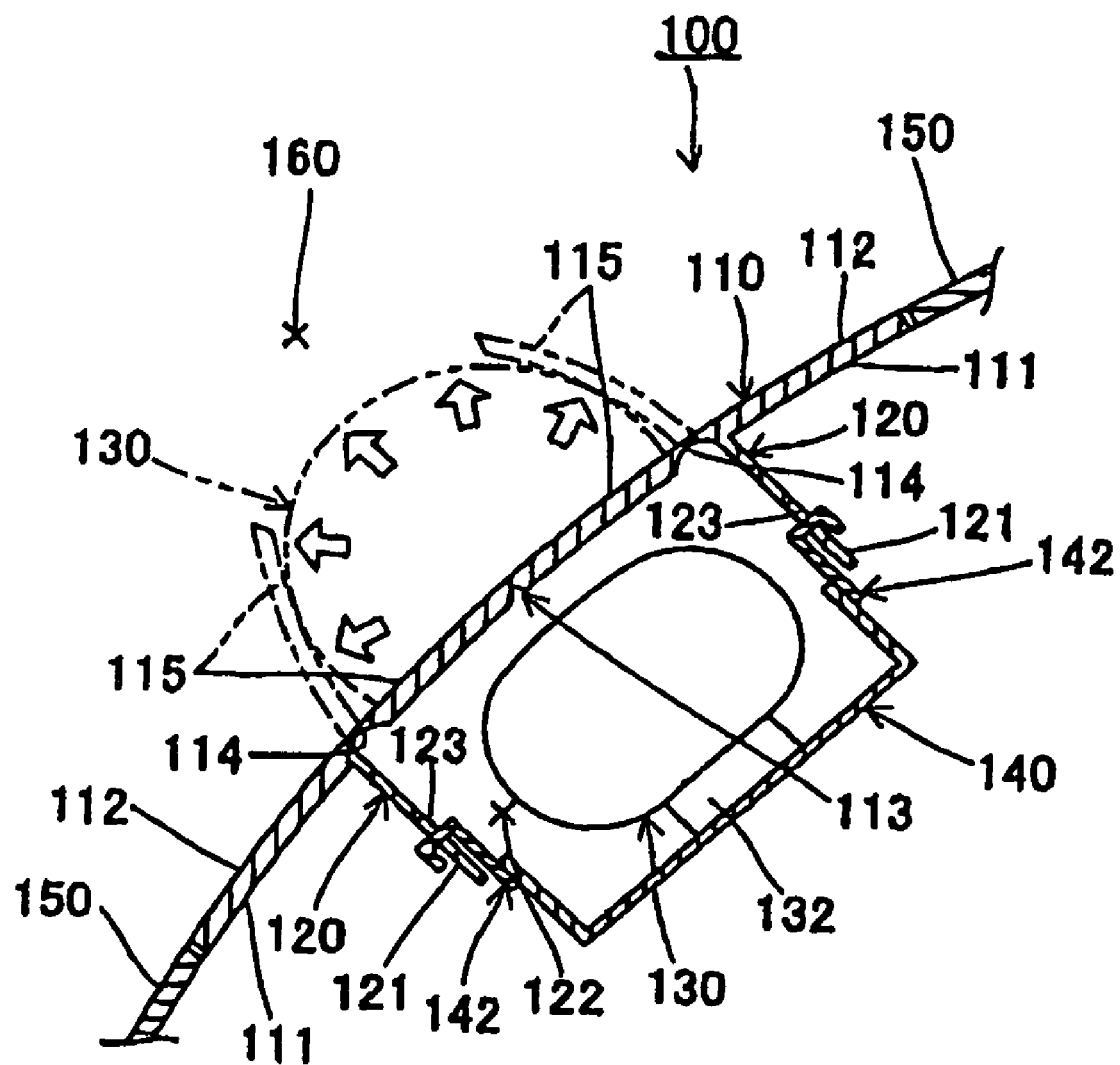
FIG. 3 is a cross-sectional view illustrating the airbag cover, a vehicle airbag, and a retainer according to an embodiment of the present invention.

FIG. 3 is a cross-sectional view illustrating a state where the airbag cover 100, the vehicle airbag 130, and the retainer 140, for example, are installed in the vehicle, according to an embodiment of the present invention.

In a state where the retainer 140 housing, for example, the vehicle airbag 130 and an inflator 132 are attached to the container 120, as illustrated by the example shown in FIG. 3, the airbag cover 100 may be mounted on an instrument panel 150. In detail, the retainer 140 may have the hook members 142 fixed thereon, and by hooking these hook members 142 onto the holes 123 provided in the supporting portion 121 of the container 120, the retainer 140 may be attached to the container 120. The retainer 140 has the capability to house the vehicle airbag 130 folded up in a predetermined manner, such as in a rolled-up manner or in an accordion-like manner. On the other hand, the inflator 132 may be built in the retainer 140 to functions as a gas supplier for supplying the vehicle airbag 130 with inflation gas. In the state where the retainer 140 is attached to the container 120 via the hook members 142 (i.e. the state shown in FIG. 3), the vehicle airbag 130 housed in the retainer 140 is also housed in the container space 122 of the container 120.

According to the airbag cover 100 illustrated by the example shown in FIG. 3, when the vehicle is involved in an accident, the inflation gas generated in the inflator 132 is sent to the vehicle airbag 130. The inflation force of the vehicle airbag 130 may rip open the top panel 110 along the tearing line 113 so that the pair of deployment doors 115 become deployed about the corresponding hinges 114 towards the front face 112 in a double-opening manner (double-swinging manner). The pair of deployment doors 115 is deployed in a manner shown in the example of FIG. 3 with double-dashed lines. The vehicle airbag 130 may pass through an opening formed by the deployed pair of deployment doors 115 so as to inflate outward towards an occupant-protection area 160. Accordingly, this may achieve a thorough protection of a vehicle occupant positioned in the occupant-protection area 160.

A method for manufacturing the airbag cover 100 will now be described with reference to FIGS. 4 to 6.

Figure 4:
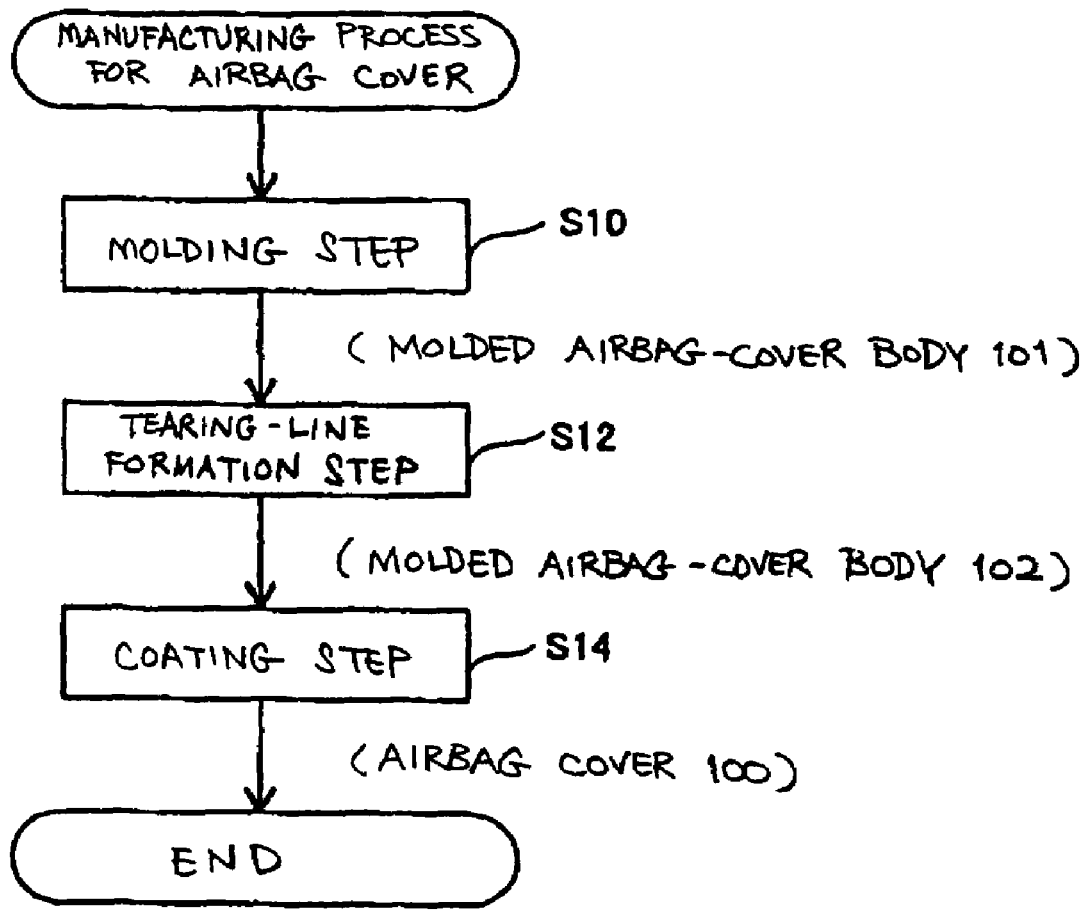
FIG. 4 illustrates the steps for manufacturing the airbag cover according to an embodiment of the present invention.
Figure 5:
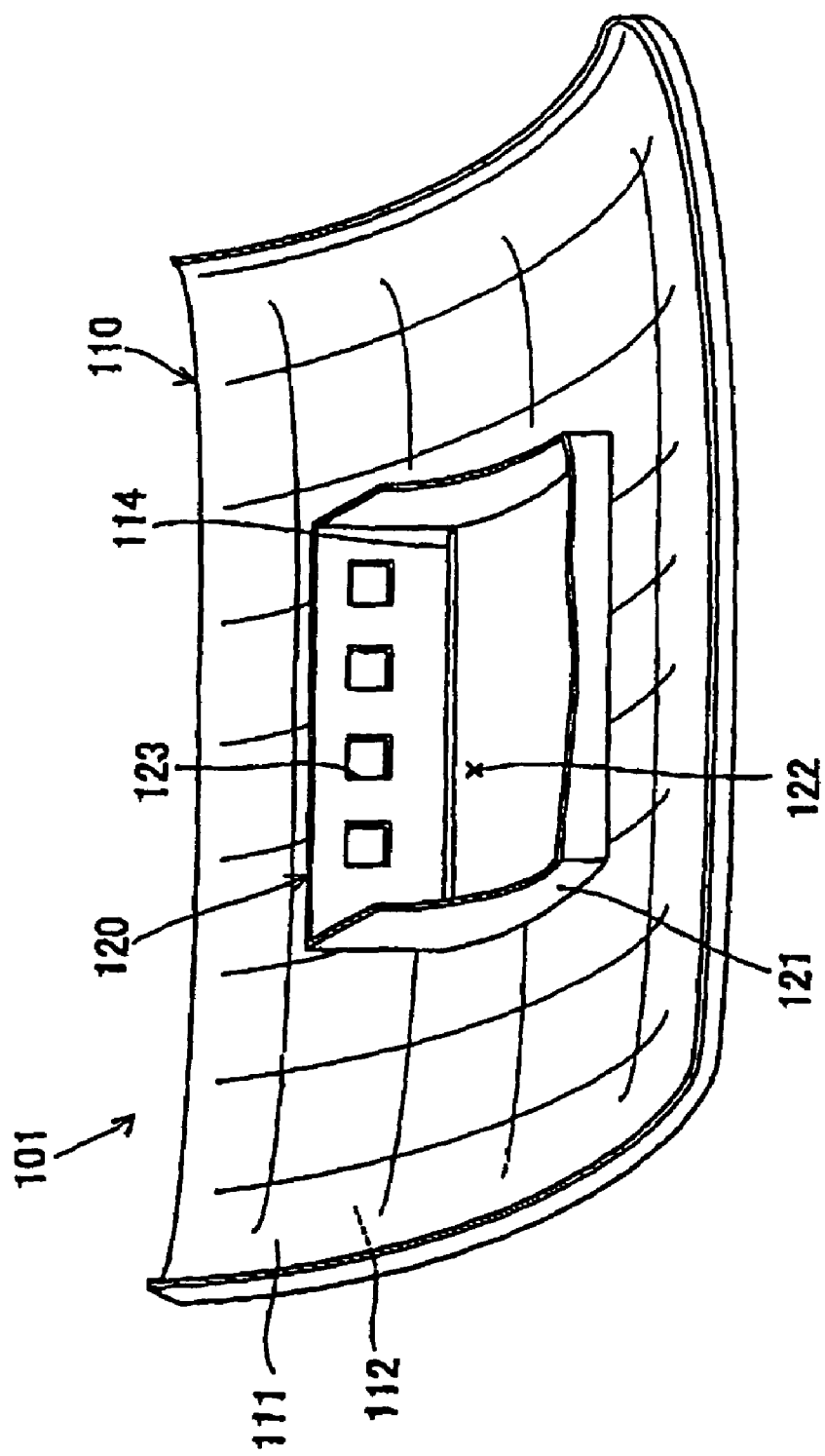
FIG. 5 is a perspective view of a molded airbag-cover body obtained by a molding step (step S10) shown in FIG. 4.

FIG. 4 illustrates the steps for manufacturing the airbag cover 100 according an embodiment of the present invention. As shown in FIG. 4, the method for manufacturing the airbag cover 100 according to this embodiment may include a molding step (step S10); a tearing-line formation step (step S12); and a coating step (step S14). Additionally, a step related with preprocessing may be performed before the molding step (step S10), and steps related with finishing and inspecting of the product may be performed after the coating step (step S14).

First, a molding process may be performed in step S10 shown in FIG. 4. This molding process may be for forming a molded airbag-cover body (i.e. a molded airbag-cover body 101 shown in FIG. 5) by integral molding so that the molded airbag-cover body 101 may include an integrated combination of the top panel 110 for covering the vehicle airbag 130 from the vehicle-cabin side, and the container 120 for housing the vehicle airbag 130. The molded airbag-cover body 101 obtained by this molding process may be a molded body in which the tearing line 113 is not formed yet. For this molding process, a typical molding unit may be used in which a resin material for forming the top panel 110 and the container 120 is poured into a mold, whereby a molded airbag-cover body 101 that includes the integrated combination of the top panel 110 and the container 120 can be formed.

After step S10, a tearing-line formation process may be performed in step S12 shown in FIG. 4. The tearing-line formation process may be accomplished via post-processing of the molded airbag-cover body 101 obtained in the molding process of step S10 in order to form the tearing line 113 by using an ultrasonic machining device 200 shown in FIG. 6. FIG. 6 illustrates an example of where the tearing line 113 is being formed by using the ultrasonic machining device 200 in a tearing-line formation process.

Figure 6:
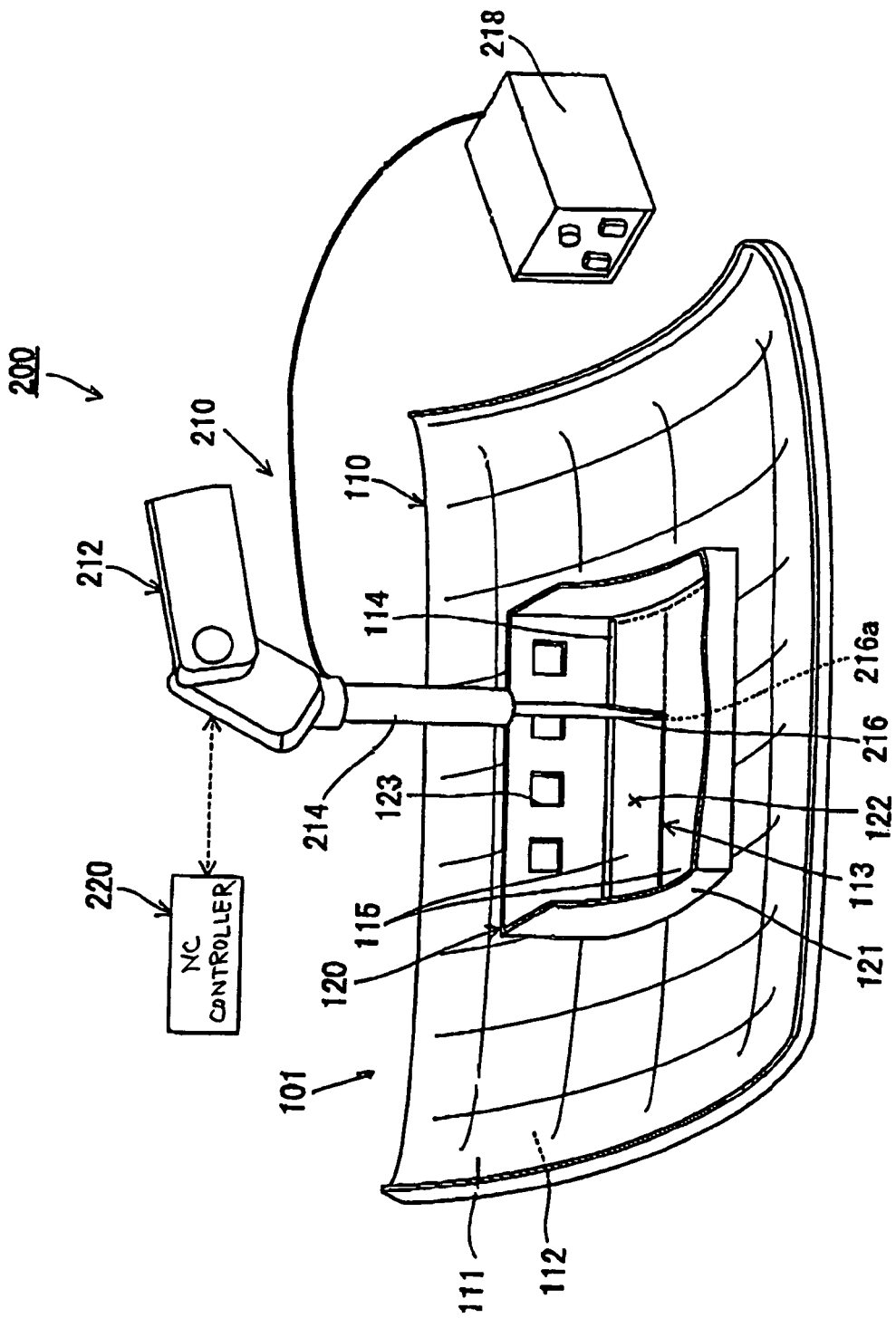
FIG. 6 is a perspective view illustrating a tearing-line formation step (step S12) shown in FIG. 4, in which a tearing line is being formed in the molded airbag-cover body by using an ultrasonic machining device.

As shown in FIG. 6, the ultrasonic machining device 200 according to this embodiment may include a drive unit 210 and an NC controller 220. The drive unit 210 may be provided with a drive arm 212, an ultrasonic transducer 214, an ultrasonic machining blade 216, and an ultrasonic generator 218. The drive arm 212 may be part of a machining robot and may be controlled based on an input signal from the NC controller 220 such that the drive arm 212 adjusts the positioning of a blade tip 216a of the ultrasonic machining blade 216. The ultrasonic transducer 214 transmits an ultrasonic wave generated by the ultrasonic generator 218 to the ultrasonic machining blade 216. The ultrasonic machining blade 216 employed may be a type in which the cutting width of the blade tip 216a is, for example, 1 mm.

Alternatively, instead of a blade-like ultrasonic machining member, like the ultrasonic machining blade 216 shown in the example of FIG. 6, other types of shapes are permissible for the ultrasonic machining member, as long as a workpiece can be machined by transmitting (applying) an ultrasonic wave to the workpiece. For example, the ultrasonic machining member may have a rod-like structure or a plate-like structure. The NC controller 220 may be for processing machining-data used for forming the tearing line 113 on the reverse face 111 of the top panel 110 of the molded airbag-cover body 101. Although not shown in detail, the NC controller 220 may be provided with, for example, a typical CPU (central processing unit) which, for example, inputs, computes, outputs, and stores the machining data for the molded airbag-cover body 101, a ROM, and a RAM.

In the ultrasonic machining device 200, the control operation of the drive arm 212 based on the input signal from the NC controller 220 allows a positional adjustment of the blade tip 216a of the ultrasonic machining blade 216 receiving an ultrasonic wave of a predetermined frequency generated by the ultrasonic generator 218. Consequently, this allows the ultrasonic machining blade 216 to perform a machining operation along a desired path so that the tearing line 113 can be formed on the reverse face 111 of the top panel 110 of the molded airbag-cover body 101. Thus, a molded airbag-cover body 102 obtained in this tearing-line formation process of step S12 may be a molded body not yet provided with a coating, which may be given subsequently in the coating process of step S14.

According to this embodiment, the machining rate using the ultrasonic machining blade 216 is higher than that using general laser machining. For this reason, this effectively leads to higher productivity of the airbag cover. Moreover, since a general-purpose device may be used for the ultrasonic machining operation, equipment costs may be kept lower than using laser machining facilities that usually require a dedicated device. Furthermore, with respect to the size reduction of the ultrasonic machining device 200, even if the section where the tearing line 113 is to be formed close to the supporting portion 121 of the container 120, the tearing line 113 can still be accurately formed into a desired shape.

After step S12, a coating process may be performed in step S14, as shown in FIG. 4. The coating process may be for applying a coating onto the molded airbag-cover body 102 obtained in the tearing-line formation process in step S12. In the coating process, the molded airbag-cover body 102 may be given a coating by using a typical coating unit, as is known in the art.

The airbag cover 100 manufactured after performing the processes of steps S10 to S14 shown in FIG. 4 may have an integrated combination of the top panel 110 and the container 120. In comparison with an airbag cover in which a component equivalent to the top panel 110 and a component equivalent to the container 120 are first formed separately and are then joined together by, for example, welding, the airbag cover 100 may have the following advantages.

Specifically, this manufacturing process of the airbag cover may use a smaller number of components and manufacturing steps and a simplified production control, thus contributing to less time and lower costs (i.e. costs required for manufacture, quality control, and development).

Furthermore, regarding the finished product of the airbag cover, the integrated combination of the top panel 110 and the container 120 may contribute to a better appearance in the bordering section between the top panel 110 and the container 120; a higher stability of the top panel 110 due to the integrated junction between the top panel 110 and the container 120; a lighter product weight of the entire airbag cover 100; and a stronger junction between the top panel 110 and the container 120. In other words, in the airbag cover 100 having the integrated combination of the top panel 110 and the container 120, the strength in the junction between the top panel and the container is higher than in a case where the two are welded together. Accordingly, this achieves an airbag cover having high strength in the junction between the top panel and the container. Such an airbag cover having high strength in the junction between the top panel and the container is advantageous especially for a vehicle airbag whose inflation force is very large. Furthermore, since the molded airbag-cover body 101 having the integrated combination of the top panel 110 and the container 120 formed via the molding process described above may have a higher rigidity and be thus less deformable in comparison with a single separate top-panel, the tearing-line formation process for post-processing the molded airbag-cover body 101 to form the tearing line 113 can be readily performed.

The technical scope of the present invention is not limited to the above embodiment, and modifications are permissible within the scope and spirit of the present invention. For example, the following alternative embodiments, which are modifications of the above embodiment, are permissible.

Although the above embodiment describes an example in which the tearing line 113 defined by the linear groove is post-processed in the top panel 110 of the airbag cover 100 by ultrasonic machining, the tearing line may be post-processed by alternative machining devices other than ultrasonic machining. Such alternative machining devices for post-processing the tearing line may be, for example, various types of cutting tools (such as cutters and rotary blades) which are used in laser machining and cutting, thermoblades, drills, end mills, needles, and water-jet nozzles that cut a workpiece by expelling water thereto. Furthermore, instead of a blade-like ultrasonic machining member like the ultrasonic machining blade 216, the ultrasonic machining member used for ultrasonic machining may alternatively have a rod-like structure or a plate-like structure.

Furthermore, although the above embodiment describes an example in which the tearing line 113 in the top panel 110 is formed into a substantially H-shape in plan view, the shape of the tearing line defined by the linear groove in the present invention is not limited to a substantially H-shape and may be changed in accordance with, for example, the specification of the airbag cover. As alternatives to the H-shape, other various shapes are permissible, such as a U-shape.

Furthermore, although the airbag cover 100 is manufactured in the order listed above, according to the above embodiment, the tearing-line formation step and the coating step may alternatively be switched in the present invention. In that case, the airbag cover 100 is manufactured in the order: the molding step, the coating step, and the tearing-line formation step. Where necessary, in the present invention, additional steps may be performed prior to the molding step, between the molding step and the groove-forming step, and after the groove-forming step.

Furthermore, although the above embodiment describes an example in which the airbag cover 100 is installed in a vehicle cabin of an automobile, the molding technique of the airbag cover which is a characteristic of the present invention can be applied to various types of vehicles other than automobiles, such as trains, motorcycles (straddle-type vehicles), aircrafts, and watercrafts.

The priority application, Japanese Patent Application No. 2004-230705 filed on Aug. 6, 2004, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method for manufacturing an airbag cover, comprising:

forming an airbag cover that includes a plate-like top panel for covering a vehicle airbag from a vehicle-cabin side, a container that is disposed on a reverse face of the top panel and that houses a vehicle airbag, and a linear groove having a depth less than a panel thickness of the top panel, wherein forming includes:

a molding step for forming a molded airbag cover body, wherein the airbag cover body includes an integrated combination of the top panel and the container; and a groove-forming step for forming the linear groove, wherein the groove-forming step is a post-processing step to the molding step, wherein the linear groove is formed on the molded airbag cover body.

2. The method of claim 1, wherein the linear groove is formed by ultrasonic machining using an ultrasonic machining device in the groove-forming step.

3. The method of claim 2, wherein the ultrasonic machining device uses an ultrasonic machining blade to form the linear groove.

4. The method of claim 2, wherein the ultrasonic machining device uses a rod-like structure to form the linear groove.

5. The method of claim 2, wherein the ultrasonic machining device uses a plate-like structure to form the linear groove.

6. The method of claim 1, wherein holes are formed in walls of the container for attaching a retainer to the container.

7. The method of claim 1, further comprising a coating step for coating the molded airbag cover body.

8. The method of claim 1, wherein the linear groove is formed in a substantially H-shape.

9. The method of claim 1, wherein the linear groove is formed in a substantially U-shape.

10. An airbag cover, comprising:

a plate-like top panel for covering a vehicle airbag from a vehicle-cabin side;

a container that is disposed on a reverse face of the top panel and that houses a vehicle airbag, wherein the top panel and the container are molded; and a linear groove on the reverse face of the top panel having a depth less than a panel thickness of the top panel such that material of the top panel is continuously present along the length of the linear groove at an area between the bottom of the groove and a side of the top panel opposite to the reverse face with the linear groove, wherein the cover is configured to separate along the groove when the airbag inflates and wherein the groove is formed by an ultrasonic machining device employing an ultrasonic machining blade.

* * * * *